A-B

INVENTOR
Omri Brandstaetter

BY
ATTYS.

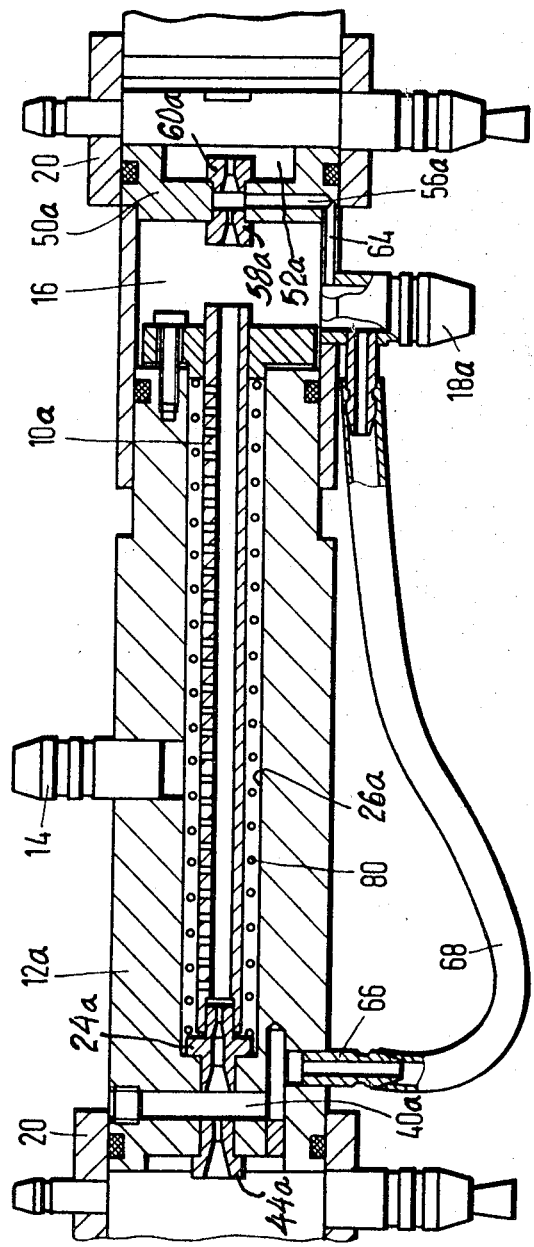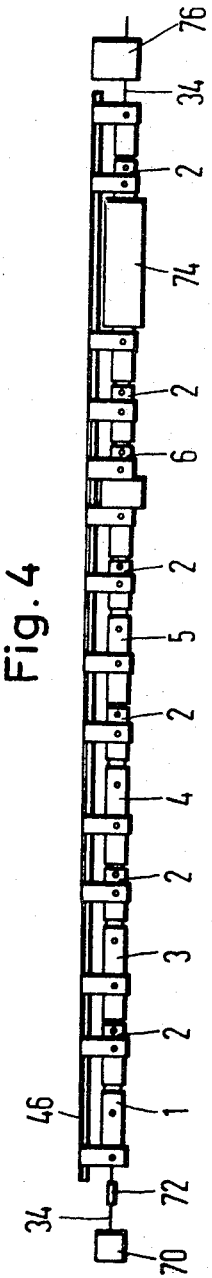

United States Patent Office 3,654,114
Patented Apr. 4, 1972

3,654,114
APPARATUS FOR THE TREATMENT AND TORSION-FREE TRANSPORTATION OF THIN WIRE
Omri Brandstaetter, Munich, Germany, assignor to Siemens Aktiengesellschaft, Berlin and Munich, Germany
Filed July 2, 1970, Ser. No. 51,887
Claims priority, application Germany, July 9, 1969,
P 19 34 818.6
Int. Cl. B01k 3/00
U.S. Cl. 204—206
12 Claims

ABSTRACT OF THE DISCLOSURE

Fluid conveying device for conveying thin wire free from torsion and bending stresses including a conveying nozzle of increasing diameter from its entry to its discharge end and extending along a pressure chamber. A series of axially aligned converging wire guides are provided at the entering end and beyond the discharge end of the conveying nozzle, to guide the wire to pass along the center of the conveying nozzle. Fluid under pressure supplied to the pressure chamber enters the conveying nozzle through a series of passageways leading through the wall of the nozzle and spaced about and along the nozzle. Fluid under pressure entering the conveying nozzle through the passageways flows towards the larger diameter end of the nozzle, and exerts a propelling force on the wire, propelling the wire through the nozzle from the smaller and out the larger diameter end of the nozzle. Any number of aligned conveying nozzles may be provided and connected in aligned relation with respect to each other and each nozzle may be supplied with treating liquid to treat the wire as conveying it.

BACKGROUND, SUMMARY AND OBJECTS OF THE INVENTION

In the production of thin wire, and particularly magnetic wires of magnetic wire storers, the wire must be run through a number of stations, in which the surface of the wire is treated. As for example, the wire has to be degreased, rinsed, the surface etched, coppered and provided with a magnetizable substance, and in conveying the wire through the processing stations or baths necessary to treat the wire in the required manner, there can be no torsional stresses exerted on the wire, since the tensions caused by the torsional stresses influence the magnetic properties of the wire.

The conveying device for wire of the present invention makes it possible to convey the wire through a series of stations free from torsion stresses, by the use of a conveyance nozzle having a nozzle passageway through which the wire passes, and converging from a small inside diameter entry end to a larger diameter discharge end to provide an increasing volume liquid propellant passageway for the wire. Liquid is supplied to the nozzle through radial passageways spaced along the nozzle and leading through the wall of the nozzle to serve as a liquid propellant for the wire. The flow direction of the liquid, therefore, is through the radial passageways and conveying nozzle from the small to the large diameter end of the nozzle, which provides a propelling force on the thin wire uniformly about the circumference thereof, sufficiently great to transfer the wire through the system.

The apparatus and system of the present invention, therefore, provides a transporting device for wire particularly adapted for conveying the wire free from torsion and bending stresses through a plurality of treatment stations.

A principal object of the present invention is to increase the efficiency in transporting thin wire by providing a liquid propelling force and system for transporting the wire free from torsion stresses on the wire.

Another object of the invention is to provide a liquid transporting device and system for propelling thin wire free from the torsion stresses caused by bending of the wire, so arranged that the propellant liquid may also serve as a treating liquid for the wire.

Another object of the invention is to provide a liquid transporting apparatus and system for propelling and treating thin wire, so arranged that a number of propelling apparatus and systems may be connected together in end-to-end relation relative to each other, to enable a series of successive treatments on the wire by the liquid transporting the wire through the system.

A still further object of the invention is to provide a liquid transporting device for wire, arranged with a view toward utmost simplicity in construction and operation, so constructed and arranged that the propellant liquid may serve as a treating liquid.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 3 is a view showing a modified form in which the invention may be carried out and showing the conveyance nozzle arranged for electroplating, with the cathode extending about the nozzle; and FIG. 4 is a diagrammatic view illustrating a complete wire conveying and treating system in which a plurality of transporting and treating nozzle structures are connected together in end-to-end relation with respect to each other.

DESCRIPTION OF PREFERRED EMBODIMENT OF THE INVENTION

Figure 1:
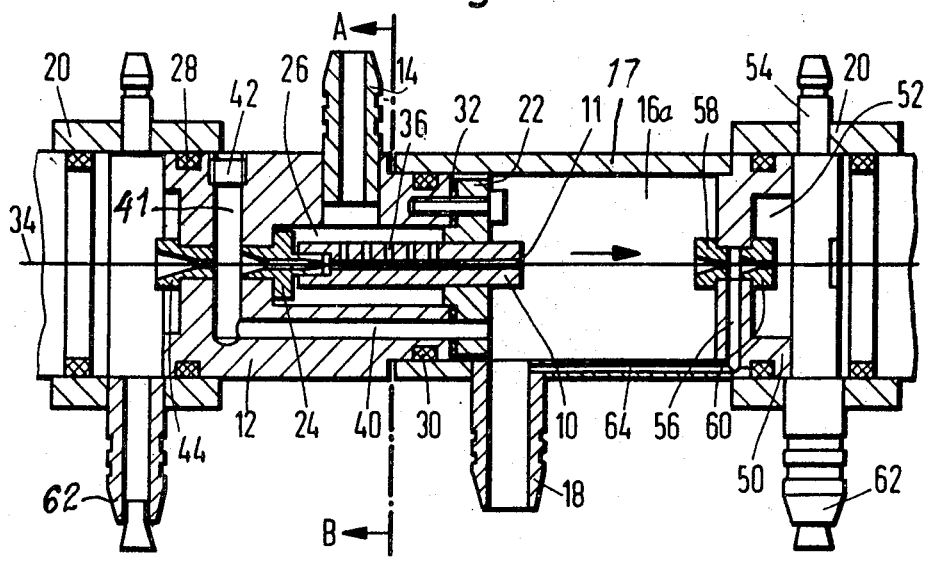
FIG. 1 is a longitudinal sectional view taken through a liquid wire transporting apparatus constructed in accordance with the principles of the present invention.
Figure 2:
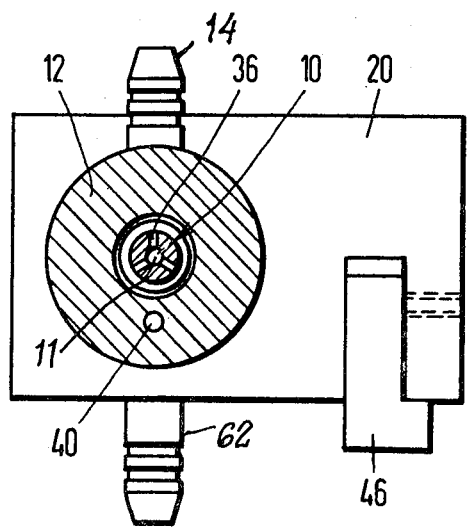
FIG. 2 is a cross sectional view taken through the apparatus substantially along line A–B of FIG. 1.

FIGS. 1 and 2 of the drawings show one unit of a series of units for transporting wire by liquid, which may be coupled with other units in end-to-end relation with respect to each other for treating, in addition to conveying wire through the system. As shown in FIG. 1, a nozzle 10 is supported within a liquid pressure chamber 26 extending along the interior portion of a support 12 which may be cylindrical in form. The nozzle 10 has a central nozzle passageway 11 gradually increasing in diameter from the entry to the discharge end of the nozzle and is carried in the pressure chamber 26 on an end plate 22 abutting the front face of the support 12 and sealed thereto as by an annular packing or face seal 32. The end plate 22 is bolted or otherwise secured to the end of the support 12 and has the nozzle 10, fitting in the center thereof with a relatively close fit, and projecting beyond the front face thereof.

A wire guide 24 is fitted in the opposite end of the pressure chamber 26 from the end plate 22 in axial alignment with the center of the passageway 11, and has a funnel-like entering end and a converging discharge end, fitted into an enlarged diameter portion of the nozzle 10 to guide the wire to pass through the center of said nozzle passageway. An inlet fitting 14 extends radially of the cylindrical support 12 and has communication with the pressure chamber 26.

The propellant fluid entering the pressure chamber 26 through the inlet 14 is supplied to the nozzle passageway 11 through a series of passageways 36, leading through the wall of the nozzle to the nozzle passageway 11 and shown as being radial passageways. The passageways 36, however, need not necessarily be radial, but may extend in radial directions and be inclined at acute angles with respect to the axial center of the nozzle passageway and converge in the direction of flow through the nozzle passageway. The passageways 36 are herein shown as being of the same diameters and spaced along the nozzle 10 equal distances from each other and also spaced equal distances apart. It is intended as a part of my invention, however, that the diameter of the passageways may be varied where it is desired to vary the pressure along the nozzle passageway, where required by treating or transporting conditions.

The nozzle 10 opens at its discharge end into a drain chamber 16 extending along a sleeve 17. Said sleeve extends along and is supported on a reduced diameter portion of the support cylinder 12, and is sealed thereto as by a seal 30. The drain chamber 16 has a drain fitting 18 leading therefrom. The drain fitting 18 may be connected with a pump or the like (not shown). A pump, however, need not necessarily be used. Fitting into the forward end of the sleeve 17 and suitably secured thereto, is an annular end cap 50, including an end plate and an axial flange extending from said end plate within a support 20, and sealed thereto. The end plate of the end cap 50 has a central opening leading therethrough having longitudinally spaced converging wire guides 58 and 60 pressed thereinto and abutting the front and rear sides respectively of the plate of the end cap 50, to guide the wire to pass through a gas separating chamber 52. The space between the guides 58 and 60 has a drain passageway 56 leading radially therefrom to a passageway 64 extending axially along the wall of the sleeve 17 and having communication with the drain fitting 18 to drain any liquid that may be on the wire through said drain by the suction created by liquid flowing from the chamber 16.

A gas separating chamber 52 is formed within a bored portion of the support 20, and is separated from the drain chamber 16 by the plate of the end cap 50 and the wire guides 58 and 60. The gas separating chamber 52 has a fitting 54 leading thereinto through the support 20, for supplying a neutral gas to said gas separating chamber and protecting the wire against harmful outside atmospheric conditions. The gas separating chamber 52 is particularly useful where a series of nozzle systems are connected together in end-to-end relation with respect to each other to neutralize one solution prior to passing the wire through a next succeeeding wire transporting and treatment device. Gas is drawn from the chamber 52 through a fitting 62, which may be connected with a suitable valve or other control means selectively operable to hold gas in said gas chamber where required.

Spaced rearwardly of the wire guide 24 and in axial alignment therewith is a wire guide 44 guiding the wire through the center of the wire guide 24. The wire guides 44 and 24 have communication at their adjacent outgoing and incoming ends with a drain passageway 41 extending radially through the support 12 and closed by a plug 42, which may be a pipe plug. The passageway 41 has communication with an axially extending passageway 40 opening into the drain chamber 16. The communicating passageways 41 and 40 in effect form suction passageways draining liquid which may pass through the wire guide 24 out the drain 18 by the suction created by liquid flowing through said drain from the drain chamber 16, it being understood that the liquid flowing into the chamber 16 through the outlet of the nozzle 10 is under pressure. Liquid will thus flow through the drain 18 under pressure, and create sufficient suction in the passageways 40 and 64, to scavenge said passageways, where the drain 18 may not be connected with a pump.

A second support 20 like the support previously mentioned extends about the rear end portion of the cylindrical support 12 and forms a support therefor and is sealed thereto as by a seal 28. The supports 20 at opposite ends of the wire transporting and treating device accommodate one support cylinder to be plugged into an advance support 20 and a next forwardly spaced support cylinder 12 to be plugged into the next forwardly spaced support 20, to thereby enable the placing as many wire transporting and treating devices in end-to-end relation into the system, as required to convey and properly treat the wire. Where several systems are plugged together, a gas separating chamber 52 is at the discharge end of each system and where filled with a neutral gas, the liquids in the successively arranged nozzle systems, which serve different functions and thereby are different, are separated from each other and the wire is protected against harmful outside atmosphere at the terminal end of each treating station.

In FIG. 3, I have shown a wire transporting unit particularly adapted for electroplating wire, as it is conveyed along a conveyance nozzle 10a similar to the nozzle 10 but longer than said nozzle and shown as being of a larger inside diameter. In the form of the invention shown in FIG. 3, a cylindrical support 12a is provided for the conveyance nozzle 10a and supports said nozzle in the same manner as shown in FIG. 1. The anode or cathode for the electroplating can be disposed in the chamber 26a between the wall of said chamber and the exterior wall of said nozzle, to effect electroplating of the wire as conveyed through the conveying nozzle. A cathode is generally indicated by reference character 80. A passageway 40a in communication with the space between wire guides 44a and 24a respectively has communication with a drain fitting 66, to collect any moisture or fluid on the wire as passing to the conveyance nozzle 15a. The drain fitting 66 is connected with a drain fitting 18a as by a flexible tube 68. In this form of the invention, as in the form shown in FIG. 1, the fluid flowing through the drain passage 18a from the drain chamber 16a, creates suction to draw fluid from the passageway 40 and along the tubes 68 for discharge with the drain fluid.

Wire guides 58a and 60a are disposed in an end cap 50a for the drain chamber 16a. Moisture is drawn from the wire passing between said wire guides through suction passageways 56a and 64a having communication with the drain 18a, as in the form of the invention illustrated in FIGS. 1 and 2. A neutralizing gas chamber 52a is also provided at the discharge end of the wire guide 60.

In FIG. 4, there is shown a plurality of conveyance nozzle systems arranged in aligned relation with respect to each other and plugged into one another. The conveyance nozzle systems are all supported on a rail 46 similar to the rail shown in FIG. 2. In this form of the invention, an entire treatment and coating process of wire can be carried out. As for example, in the nozzle and conveyance system 1, the wire can be degreased by using a degreasing liquid to convey the wire along the conveyance nozzle 10, in the manner shown and described in FIG. 1. A rinsing solution may be used as the conveying fluid in a second conveying system 2. In the third conveyance nozzle system 3 the oxides on the wire can be removed and the conveyance nozzle systems 4, 5 and 6 can be utilized to coat the surface of the wire. Rinsing conveyance nozzle systems 2 are shown as being disposed between the degreasing system 1 and oxide removing system 3, between the oxide removing system 3 and coating system 4, and as being interposed along said coating system where needed, to rinse the product between each treatment station, and to assure a clean final product.

In FIG. 4 a supply roll 70 from which the wire is trained is diagrammatically shown at the incoming end of a treating system. A speed regulator 72 is shown as spaced between said supply roll and the first nozzle conveyance system 1. A heat treatment station 74 is shown as positioned between the two rinsing nozzle systems 2 at the outgoing end of the treating line. A measuring device 76 for measuring and checking the surface of the wire may be disposed beyond the terminal end of the treating line. The supply roll or reel 70, speed regulator 72, heat treatment station 74 and measuring and checking device 76 may be of various suitable constructions, which are no part of the present invention, so need not herein be shown or described further.

It may be seen from the foregoing that I have shown a simple form of transporting system for wire for conveying thin wire along a straight line path free from the torsional stresses of bending of the wire and that the system may have a series of units, each of which may serve as a treatment station for the wire and that transportation of the wire is attained by the treating of liquid under pressure. Any number of wire treatment processes may thus be carried out, and the nozzle conveyance system of the present invention is particularly advantageous for the production of magnetic wires for magnetic wire storers.

It may further be seen that the torsion free and bending free conveying apparatus and process of the present invention may be so arranged as to exert a fixed tensile force on the wire and that the conveying of the wire through the series of processes is free from torsional stresses on the wire.

It should further be understood that conveyance of the wire is attained due to the increasing diameter of the conveyance nozzle from the entering to discharge end thereof, directing the liquid toward the large diameter end of the nozzle, in which the liquid flow maintains a force on the wire sufficiently great to effect transport thereof.

I claim as my invention:

1. A device for conveying wire free from torsion and bending stresses on the wire, comprising
    a conveyance nozzle having a central nozzle passageway leading therethrough uniformly diverging in cross sectional area from the entering to the discharge end thereof,
    a plurality of passageways leading into said nozzle passageway,
    a chamber extending about said nozzle, and
    means supplying liquid under pressure to said chamber to effect the supply of liquid through said passageways to and along said nozzle passageway for propelling the wire by the liquid force exerted thereon moving along said nozzle and out the larger diameter end thereof.

2. The device of claim 1, in which the chamber includes a hollow cylinder,
    wherein support means are provided for said cylinder at each end thereof,
    wherein an end plate forms a closure for the discharge end of said cylinder and a mounting for said nozzle, and
    wherein wire guide means are provided for guiding the wire to and from said nozzle passageway in axial alignment with the center thereof.

3. The device for conveying wire of claim 2,
    wherein the wire guide means comprises spaced converging wire guides at the entering end of the conveyance nozzle and other spaced wire guides spaced from the discharge end of said conveyance nozzle, and suction passageways leading from the spaces between said wire guides for drawing liquid therefrom.

4. The wire conveying device of claim 3,
    wherein a drain chamber is provided between the discharge end of the nozzle and the wire guides spaced from the discharge end of said nozzle,
    wherein a discharge tube leads from said drain chamber, and
    wherein suction passageways lead from the spaces between said wire guides to said drain chamber, to effect the drawing of liquid from the wire as it enters and leaves the conveying device by the suction created by discharge of liquid through said discharge tube.

5. The wire conveying device of claim 2,
    wherein the conveyance nozzle is in the form of an elongated hollow cylinder having a smaller inside diameter at its inlet end than its discharge end, and
    wherein the passageways leading to said nozzle passageway are in the form of radial passageways spaced along said cylinder and circumferentially thereabout.

6. The wire conveying device of claim 5,
    wherein the radial passageways are equally spaced and are all of the same diameter.

7. The wire conveying device of claim 5,
    wherein the radial passageways are of different diameters to provide differing pressures along said nozzle passageway.

8. The wire conveying device of claim 3,
    wherein the conveyance nozzle is in the form of a hollow cylinder having a smaller inside diameter at its inlet end than its discharge end, and
    wherein the passageways leading to said nozzle passageway are inclined at acute angles relative to the axial center of said nozzle passageway to exert liquid propulsion forces in the direction of the larger diameter end of said nozzle passageway.

9. The wire conveying device of claim 2, including a separator chamber at the discharge end of the forwardmost wire guide and means for admitting a neutralizing gas to said chamber.

10. A wire conveying device in accordance with claim 5, including a plurality of wire conveying devices, means for supporting said wire conveying devices in end-to-end relation relative to each other, to effect a series of treatment operations in addition to the conveying operations thereof, a separator chamber at the terminal end portion of each wire conveying device, and means for admitting neutralizing gas to said chamber.

11. A wire conveying device in accordance with claim 5, wherein a cathode is provided in the chamber for said conveyance nozzle for the galvanic treatment of wire passing through said conveyance nozzle.

12. The wire conveying device of claim 9,
    wherein the successive conveying devices are arranged into end-to-end relation relative to each other and form treatment stations adapted for the production of magnetic wires or magnetic wire storers.

References Cited

UNITED STATES PATENTS

| | | | |
|---|---|---|---|
| 2,445,675 | 7/1948 | Lang | 204—209 |
| 3,436,330 | 4/1969 | Wright et al. | 204—207 |
| 3,144,187 | 8/1964 | Naumann | 226—95 |
| 3,452,910 | 7/1969 | Richter | 226—91 |

FREDRICK C. EDMUNDSON, Primary Examiner

U.S. Cl. X.R.

204—28; 226—7, 97